United States Patent

[11] 3,575,493

[72] Inventor George Harry Heilmeier
 Philadelphia, Pa.
[21] Appl. No. 847,659
[22] Filed Aug. 5, 1969
[45] Patented Apr. 20, 1971
[73] Assignee RCA Corporation

[54] FAST SELF-QUENCHING OF DYNAMIC SCATTERING IN LIQUID CRYSTAL DEVICES
2 Claims, 3 Drawing Figs.

[52] U.S. Cl. .................................................. 350/160
[51] Int. Cl. .................................................. G02f 1/28
[50] Field of Search .......................................... 350/160,
(L.C. Digest), (S. Lib.)

[56] References Cited
UNITED STATES PATENTS
3,519,330 7/1970 Heilmeier ..................... 350/160

Primary Examiner—Ronald L. Wibert
Assistant Examiner—J. Rothenberg
Attorney—H. Christoffersen ABSTRACT: A liquid crystal element is operated within a critical frequency range such that upon removal of the exciting electric field, the dynamic scattering exhibited by the crystal decays within a matter of milliseconds—an interval which is substantially shorter than the usual natural decay time. The critical frequency range is related to the conductivity (which is temperature and voltage dependent) and dielectric constant of the liquid crystal and is precisely defined by equations in the detailed description below.

INVENTOR.
George H. Heilmeier
BY James Cohen
ATTORNEY

FAST SELF-QUENCHING OF DYNAMIC SCATTERING IN LIQUID CRYSTAL DEVICES

BACKGROUND OF THE INVENTION

The article "Dynamic Scattering: A New Electro-optic Effect" by G. H. Heilmeier, L. A. Zanoni and L. A. Barton, Proceedings of the IEEE, Volume 56, No. 7, July, 1968, discusses nematic liquid crystals of a type of interest in the present application. As explained there, such crystals, when in an unexcited state, are relatively transparent to light and when placed in an excited state by an applied electric field, scatter light. The light scattering, termed "dynamic scattering," is believed to result from turbulence developed in the crystal by ions in transit.

The dynamic scattering exhibited by liquid crystals may be employed in reflective, absorptive and transmission type flat panel displays, in light shutters and in other applications. However, the natural recovery time of the crystal, that is, its "turnoff" time, which is a function of such factors as the crystal material, the spacing between electrodes, and the crystal temperature, is relatively long. For example the turnoff time at room temperature for typical materials may be from 30 to several hundred milliseconds (1 millisecond = 0.001 second). For certain applications, the long turnoff time is a serious disadvantage. For example, when the information signal of a liquid crystal display system rapidly change its value, the liquid crystal elements of the display matrix may not as rapidly be able to follow these changes. The result is objectionable smear of moving objects, known as "trailing edge" smear.

The turnoff time of the liquid crystal can be reduced by applying thereto a quenching electrical signal. This signal can be either a short, direct voltage pulse, that is, a pulse of sufficient amplitude to align the dipoles of the liquid crystal but of insufficient duration to cause substantial ion injection into the liquid crystal or it can be a relatively high frequency alternating voltage signal. The frequency of the latter, it has introduce found, must be greater than that which will cause dynamic scattering to occur and lower than some upper frequency limit. For example, for some crystals, an alternating voltage quenching electrical signal in the range of 2 to 20 kilohertz has been found substantially to reduce the liquid crystal turnoff time. In both the case of the direct voltage and alternating voltage quenching signal, the electric field due to the signal "snap orients" the dipoles of the turbulent fluid without introducing additional disruption due to ions in transit. In other words, the applied fields introduce a dielectric torque which is much larger than the conduction induced torque.

While the above turnoff methods are perfectly suitable, they do require additional circuits and this increases the expense of the liquid crystal display or other system. The object of the present invention is to provide a method for operating a liquid crystal in such a way that it naturally self-quenches at a speed comparable to that obtained previously by the methods discussed above but without the need for a turnoff circuit.

SUMMARY OF THE INVENTION

The alternating voltage employed to cause self-quenching of dynamic scattering to occur in a liquid crystal is in the frequency range, the lower limit of which is about $1.4\sigma/2\pi D$ and the upper limit of which is within the range in which dynamic scattering occurs, where:

$\sigma$ = conductivity in (ohm-centimeters)$^{11}$;

$D = \epsilon\epsilon_o$;

$\epsilon$ is the dielectric constant of the liquid crystal material; and $\epsilon_o = 8.85 \times 10^{114}$ farads/centimeter and is the dielectric constant of free space.

DETAILED DESCRIPTION

Figure 1:
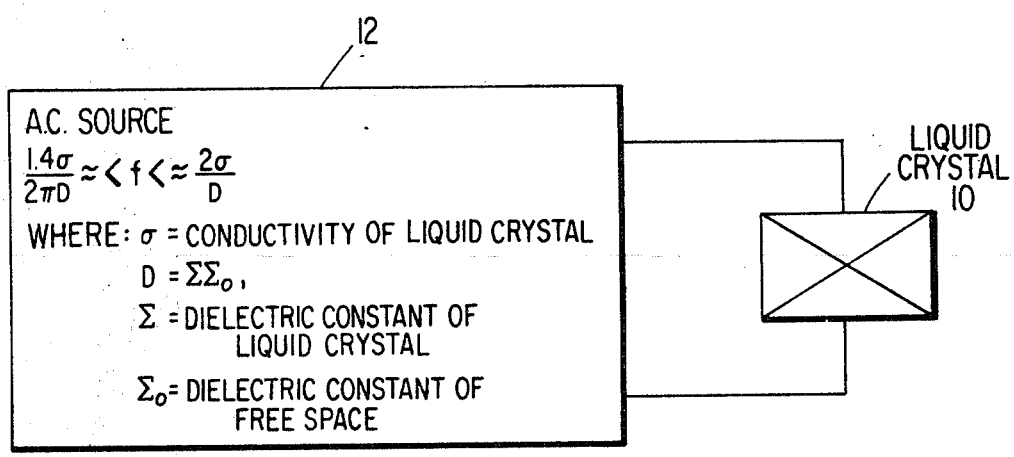
FIG. 1 is a block diagram of a circuit for practicing the method of the present invention.

The liquid crystal element shown schematically at 10 in FIG. 1 is basically a parallel plate capacitor with a liquid crystal dielectric. The method of fabricating the device has been described previously in the literature as, for example, in G. H. Heilmeier, L. A. Zanoni and L. A. Barton, Applied Physics Letters 13, 46 (1968). The plates are conductors at least one of which is transparent and they are usually formed on glass. The thickness of the liquid crystal layer between the plates may be of the order of 25 microns or less, that is, 1 mil or less and is held in place between the plates by capillary action.

In operating a liquid crystal element such as this, the present inventor has discovered that by controlling certain of the liquid crystal cell parameters and the operating frequency and amplitude of the alternating voltage employed to produce the dynamic scattering, that upon the removal of the voltage, the liquid crystal self-quenches in a very short interval of time. For example, in the circuit shown in FIG. 1 in which the liquid crystal has a material dielectric constant $\epsilon$ of about 3.5 and a conductivity of about $10^{110}$ (ohm-centimeters)$^{11}$ and in which the frequency applied by source 12 is a gated 600 hertz sine wave, the performance shown in FIG. 2 is obtained.

Figure 2:
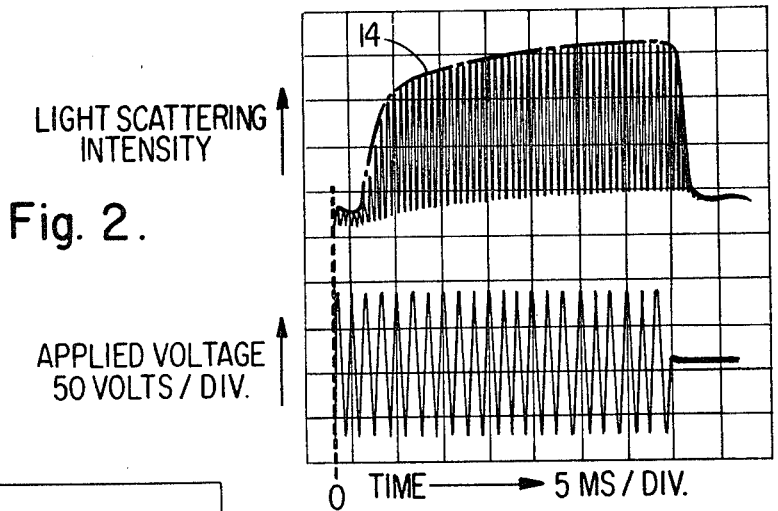
FIG. 2 is a drawing of waveforms to explain the operation of the circuit of FIG. 1.

The lower waveform of FIg. 2 is the voltage applied to the liquid crystal. The upper waveform of FIg. 2 consists of two parts. The oscillations within envelope 14 are obtained with the aid of a photomultiplier positioned to receive the light reflected from the liquid crystal 12 when it is excited by the lower wave of FIG. 2. The photomultiplier has a relatively short time constant and is able to follow the variations in intensity of the actual light scattering which is produced. Each time the applied voltage causes maximum ion motion, and this occurs twice each cycle, the light scattering is maximum, and between these intervals the light scattering is minimum. This explains why the frequency of the light scattering wave is double that of the applied voltage wave. The heavy line 14, which is the envelope of the light scattering curve, is what is observed by the eye. The eye intergrates the amount of light scattered by the light crystal, as it is not able to follow the rapid change from maximum to minimum light scattering condition of the liquid crystal. This curve 14, for the major portion of its extent, is similar to what would be obtained by applying a direct voltage pulse to the liquid crystal or by applying a conventional alternating voltage turn-on pulse to the crystal, both as described in the introductory portion of the present application. However, with the system parameters adjusted in the manner discussed in detail below, when the alternating voltage produced by source 12 is terminated, the light scattering intensity very abruptly decays. The decay time, that is, the turnoff time, is roughly 3 milliseconds. The same liquid crystal under direct voltage excitation has a turnoff time of approximately 100 milliseconds!

The present inventor has found experimentally that a liquid crystal which rapidly self-quenches after alternating voltage excitation exhibits the following properties:

1. For a given amplitude of the applied alternating voltage, there is a critical frequency range over which fast self-quenching is observed. Below this range, the decay time increases markedly while above it no dynamic scattering is observed.

2. Raising the amplitude of the applied alternating voltage while maintaining the frequency constant flat the decay time. Fast self-quenching can be restored if the frequency natural also raised. As will be shown shortly, according to the theory of operation which has been formulated, this effect can be explained in terms of the conductivity of the liquid crystal, the conductivity being voltage dependent.

3. Raising the temperature of the liquid crystal while maintaining the amplitude of the applied voltage constant requires an increase in the frequency of the voltage to retain the fast self-quenching characteristic of the liquid crystal. Again, raising the temperature raises the conductivity and it is the conductivity which is one of the factors upon which the fast self-quenching effect depends.

4. As the conductivity of the material is increased, the frequency range of the applied voltage necessary to permit fast self-quenching is shifted to a higher range. If the conductivity of the liquid crystal is made too high, however, fast self-quenching is no longer observed.

It has been observed that when operating in the fast self-quenching mode, essentially 100 percent modulation of the scattered light is obtained. In other words, the liquid crystal produces substantially the maximum amount of light scattering which is possible. This behavior is obtained, however, only when the current through the liquid crystal cell leads the voltage by 55° to 60° or more. As the lead angle between current and voltage decreases to less than 55°, modulation decreases sharply from 100 percent.

The clues above have led to the development of the following theory as to why self-quenching occurs and to a determination of the conditions which are necessary for self-quenching. The tangent of the phase angle $\Phi$ discussed above is simply the ratio of displacement current $I_d$ to the conduction current $I_c$, where the conduction current refers to the flow of free charges and the displacement current is analogous to the current employed to charge a capacitor.

$$\tan \phi = \frac{I_d}{I_c} = \frac{\omega DE}{\sigma E} \quad (1)$$

where
$E$ = electric field
$\sigma$ = the field (and temperature) dependent conductivity of the liquid crystal
$D = \epsilon\epsilon_0$, where
$\epsilon_0$ = the free space dielectric constant $8.85 \times 10^{14}$ farads/centimeter
$\epsilon$ = the dielectric constant of the liquid crystal and for a typical material may be of the order of 3.5
$\omega$ = frequency in radians = $2\pi f$, where
$f$ = frequency in hertz Experimentally, as indicated above, self-quenching requires $\phi > 55°$. Therefore:
$\tan \Phi > 1.4$  (2)
$I_d > 1.4 \, I_c$  (3)

Substituting equation (1) into equation (3) and solving for $f$ gives:

$$f > \frac{1.4\sigma}{2\pi D} \quad (4)$$

The last equation above takes into account the four observed characters given previously. The conductivity $\sigma$ is a function of the applied electric field and this, in turn, is a function of the amplitude of the alternating voltage driving signal. The conductivity also is a function of temperature. The frequency $f$ is directly proportional to the conductivity and inversely proportional to the dielectric constant $\epsilon$ of the liquid crystal.

As mentioned above, for typical liquid crystal material $\epsilon$ $10^{110}$ (ohms cms)$^{11}$ and $\epsilon$ 3.5. Substituting these numbers into equation (4) and solving gives:

$$f > \frac{1.4 \times 10^{-10}}{3.5 \times 8.85 \times 10^{-14} \times 6.28} > \sim 70 \text{ Hz}.$$

This value is approximately what is observed experimentally for excitation voltages below 40 volts. At higher voltages, the conductivity increases with voltage and hence the lowest frequency at which self-quenching can occur increases.

Figure 3:
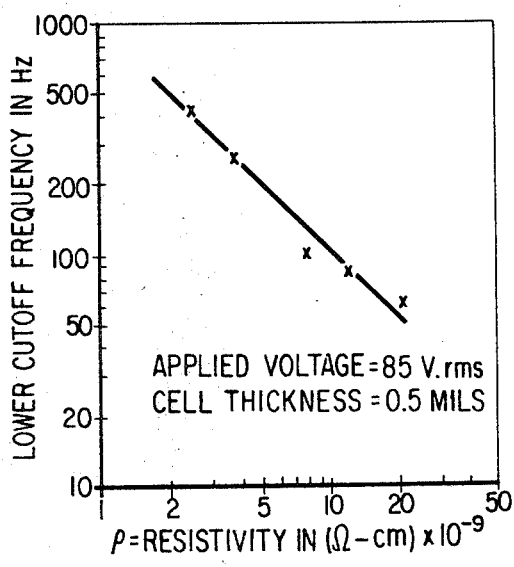
FIG. 3 is a graph showing the lower cutoff frequency for self-quenching as a function of the resistivity of the liquid crystal.

A plot of the experimentally determined lower cutoff frequency for self-quenching as a function of material resistivity for a driving voltage amplitude of 85 volts RMS, is given in FIG. 3. It is clear that the cutoff frequency varies inversely with resistivity as predicted by equation (4). Once above the critical frequency, self-quenching occurs up to the cutoff frequency for dynamic scattering. This value is determined by space charge buildup and is roughly equal to the reciprocal of the dielectric relaxation time, that is, it is roughly equal to $2\sigma/D$.

The effect discussed herein is present in nematic liquid crystals of the type operating on the principle of dynamic scattering. Some typical examples are both the compounds of Table I below and the mixtures of Table II below. In Table II, mixture 11 is

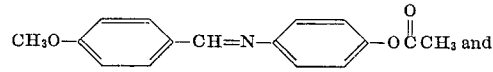

has transition temperatures of 81°C. and 110° C.

TABLE I.—(COMPOUNDS)

$$X-\langle\!\!\!\bigcirc\!\!\!\rangle-CH=N-\langle\!\!\!\bigcirc\!\!\!\rangle-Y$$

| Compound Example | X | Y | Crystal-mesomorphic transition temp., °C. | Mesomorphic-isotropic liquid transition temp., °C |
|---|---|---|---|---|
| 1 | CH₃CH₂C̈O | —OCH₃ | 86 | 118 |
| 2 | CH₃(CH₂)₂C̈O— | Same as above | 86 | 119 |
| 3 | Same as above | —OC₆H₁₃ | 86 | 120 |
| 4 | C₄H₉O— | —OC̈CH₃ | 82 | 113 |
| 5 | iso C₅H₁₁O— | Same as above | 74 | 82 |
| 6 | C₆H₁₃O— | do | 88 | 109 |
| 7 | C₈H₁₇O— | do | 80 | 105.5 |
| 8 | C₉H₁₉O— | do | 86 | 100 |
| 9 | CH₃O— | —OC̈(CH₂)₂CH₃ | 49–50 | 113 |
| 10 | CH₃O | Same as above | 55 | 100 |

TABLE II.—(MIXTURES)

| Mixture Example | Components | Crystal-mesomorphic transition temp., ° C. | Mesomorphic-isotropic liquid transition temp., ° C. |
|---|---|---|---|
| A | 50% 11–50% 4 | 47 | 108 |
| B | 35.1% 11–32.6% 4–32.3% 7. | 40 | 103 |
| C | 25.5% 11–24.5% 4–50% 7. | 45 | 103 |
| D | 25% each of 11, 4, 6 and 7. | 39 | 104 |
| E | 50.1% 3–49.9% 2 | 48 | 118 |
| F | 34.8% 3–34.6% 2 30.6% 1. | 53 | 117 |
| G | ⅓ wt. ratio each of 9, 4 and 11. | 22 | 105 |
| H | ⅓ wt. ratio each of 9, 10, 11. | 25 | 105 |
| I | 50% 9–50% 10 | 45 | 106 |

The voltage range over which the effect has been observed extends from roughly 40 to over 200 volts. However, the particular voltage range for a particular sample is expressed in the equation already given, as $\sigma$ the conductivity, is voltage dependent. So, for a given frequency and dielectric constant, and initial value of $\sigma$, the voltage range readily may be determined and for a given voltage, given initial value of $\sigma$ and given dielectric constant, the frequency range may be determined, the lower limit of the latter being shown in FIG. 3.

Following is a qualitative explanation of why the self-quenching discussed above occurs. In the usual operation of a liquid crystal in which an alternating-frequency field is employed to produce dynamic scattering, there are two competing effects. One is the tendency of the dipoles of the crystal (the rodlike elements) to follow the field. When the field is in one direction, the dipoles tend to line up with the field in that direction and as the field changes its direction, the dipoles tend to flip over and align with the field in the other direction. This effect tends to cause the liquid crystal to look relatively transparent because when the dipoles become aligned in a regular pattern there is very little light scattering from the dipoles. The second effect is that the voltage creating the electric field causes ions to be injected into the liquid crystal and these ions tend to cause turbulent motion of the dipoles making up the crystal. The turbulent motion manifests itself as the dynamic scattering of light. In other words, this competing effect tends to make the crystal relatively opaque.

In the normal alternating voltage operation of the crystal, when the alternating electric field is removed, the crystals are in relatively disorientated state and it takes a considerable time—the 30 to several hundred milliseconds mentioned in the introductory portion of this application—for the dipolar regions to naturally relax and to look relatively transparent. In the method of operation of the present application, the same two competing effects as discussed above are present. However, when the circuit and device parameters are those given, while during the application of the alternating voltage to the crystal the domains of the liquid crystal are sufficiently disorientated relative to one another to produce dynamic scattering, they are not as disorientated as in the usual method of operation. Each small domain within the crystal, each of which domain consists of aligned dipoles, attempts to follow the relatively high driving electric field as the field changes its polarity. However, the injected ions disturb the domains sufficiently that each such domain is slightly out-of-phase with its adjacent neighbor domains. While the effect observed by the eye is that of dynamic scattering just as in the usual manner of operation, when the alternating field is removed, there is much less reorientation which is required to place the various domains into alignment again. The liquid crystal fluid, in other words, is in a more uniform state than in the case of "pure" dynamic scattering. As a result, the scattering returns rapidly (in a matter of under 10 milliseconds and generally is less than 5 milliseconds) to its residual value—the value at which it appears to the eye to be transparent.

I claim:

1. A method of operating a nematic liquid crystal of the type which exhibits dynamic scattering comprising the step of applying to the crystal an alternating voltage at a frequency $F$ greater than approximately $1.4\sigma/2\pi D$ and not more than the upper limit at which dynamic scattering occurs and of sufficient amplitude to cause dynamic scattering, whereby upon removal of said voltage the liquid crystal returns to its unexcited condition in a relatively short interval of time, where $\sigma$ is the conductivity in (ohm-centimeters)[11] of the liquid crystal, $D=\epsilon\epsilon_o$, $\epsilon$ is the dielectric constant of the liquid crystal, and $\epsilon_o = 8.85 \times 10^{114}$ farads/centimeter = the dielectric constant of free space.

2. A method of operating a nematic liquid crystal of the type which exhibits dynamic scattering to insure self-quenching within a short interval after the exciting voltage has been turned off comprising, the step of applying to the crystal an alternating voltage of sufficient amplitude to cause dynamic scattering and in the frequency range between the limits of about $1.4\sigma/2\pi bD$ and about $2\sigma/D$, where: $\sigma$ is the conductivity in (ohm-centimeters) [11], $D=\epsilon\epsilon_o$, $\epsilon$ is the dielectric constant of the liquid crystal, and $\epsilon_o = 8.85 \times 10^{114}$ farads/centimeter and is the dielectric constant of free space.

UNITED STATES PATENT OFFICE
CERTIFICATE OF CORRECTION

Patent No. 3,575,493     Dated  April 20, 1971

Inventor(s) George Harry Heilmeier

It is certified that error appears in the above-identified patent and that said Letters Patent are hereby corrected as shown below:

Column 1, line 65, after "$\sigma=$" insert ---the---
Column 1, line 65, "(ohm-centimeters)$^{11}$" should read ---(ohms-centimeters)$^{-1}$---
Column 1, line 68, "$10^{114}$" should read ---$10^{-14}$---
Column 2, line 26, "$10^{110}$ (ohm-centimeters)$^{11}$" should read ---$10^{-10}$ (ohm-centimeters)$^{-1}$---
Column 3, line 38, "$10^{114}$" should read ---$10^{-14}$---
Column 4, line 15, "$10^{110}$ (ohms cms)$^{11}$" should read ---$10^{-10}$ (ohms cms)$^{-1}$---

Table I, last line, should read ---  $-OC(CH_2)_3CH_3$ ---

Column 6, line 36, "(ohm-centimeters)$^{11}$" should read ---(ohm-centimeters)$^{-1}$---
Column 6, line 38, "$10^{114}$" should read ---$10^{-14}$---

Column 6, line 47, " (ohm-centimeters)$^{11}$" should read ---(ohm-centimeters)$^{-1}$---
Column 6, line 48, "$10^{114}$" should read ---$10^{-14}$---

Signed and sealed this 21st day of December 1971.

(SEAL)
Attest:

EDWARD M. FLETCHER, JR.          ROBERT GOTTSCHALK
Attesting Officer                Acting Commissioner of Patents